United States Patent
Gwin et al.

(10) Patent No.: US 7,678,169 B1
(45) Date of Patent: *Mar. 16, 2010

(54) OIL FILL CAP WITH AIR/OIL SEPARATOR

(75) Inventors: Jared M. Gwin, Cookeville, TN (US);
Thomas J. Braun, Stoughton, WI (US);
Thom H. Steger, Cookeville, TN (US);
Roger L. Zoch, McFarland, WI (US);
Kurt M. A. Badeau, Evansville, WI (US); Jeffrey A. Fedorowicz, Madison, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 550 days.

This patent is subject to a terminal disclaimer.

(21) Appl. No.: 11/485,138

(22) Filed: Jul. 12, 2006

(51) Int. Cl.
*B01D 50/00* (2006.01)
*B01D 59/50* (2006.01)

(52) U.S. Cl. .................. 55/385.4; 55/338; 55/340; 55/462; 55/466; 55/DIG. 19; 96/360; 123/41.86; 123/519

(58) Field of Classification Search .............. 123/519, 123/41.86; 96/360; 55/385.4, 462, 338, 55/340, 466, DIG. 19
See application file for complete search history.

(56) References Cited

U.S. PATENT DOCUMENTS

| | | | |
|---|---|---|---|
| 1,548,288 A | | 8/1925 | Smith |
| 1,761,944 A | | 6/1930 | Smith |
| 2,493,617 A | * | 1/1950 | Chubbuck ............... 123/573 |
| 3,201,925 A | | 8/1965 | Shada |
| 3,433,231 A | | 3/1969 | Siragusa |
| 3,923,480 A | * | 12/1975 | Visch ..................... 96/360 |
| 4,012,209 A | | 3/1977 | McDowell et al. |
| 4,014,673 A | | 3/1977 | Kinnison |
| 4,401,093 A | | 8/1983 | Gates, Jr. et al. |
| 4,993,517 A | * | 2/1991 | Leipelt et al. ............ 184/105.1 |
| 5,129,371 A | | 7/1992 | Rosalik, Jr. |
| 5,201,301 A | | 4/1993 | Re |
| 5,205,848 A | | 4/1993 | Blanc et al. |

(Continued)

FOREIGN PATENT DOCUMENTS

DE 1544126 6/1969

(Continued)

OTHER PUBLICATIONS

Highly Efficient Oil Separation Systems for Minimised Oil Carry Over, MTZ Apr. 2008, vol. 69, pp. 32-37.

*Primary Examiner*—Jason M Greene
*Assistant Examiner*—Anthony Shumate
(74) *Attorney, Agent, or Firm*—Andrus, Sceales, Starke & Sawall, LLP; J. Bruce Schelkopf

(57) ABSTRACT

An oil fill cap for an internal combustion engine replaces a standard cap and provides separation of air and oil in a separation zone within the cap body. The cap body defines a plurality of passages therethrough, including an upstream passage, and first and second downstream passages meeting at a separation junction. The cap body defines a separation zone at the separation junction and receiving the air/oil mixture from the engine through the upstream passage, and sending separated air to the first downstream passage, and sending separated oil to the second downstream passage.

5 Claims, 2 Drawing Sheets

U.S. PATENT DOCUMENTS

| | | | |
|---|---|---|---|
| 5,329,913 A | 7/1994 | Suzuki et al. | |
| 5,460,147 A | 10/1995 | Bohl | |
| 5,562,087 A * | 10/1996 | Wright | 123/572 |
| 5,564,401 A | 10/1996 | Dickson | |
| 6,073,618 A | 6/2000 | Sanders et al. | |
| 6,074,448 A | 6/2000 | Schulz et al. | |
| 6,152,120 A | 11/2000 | Julazadeh | |
| 6,202,613 B1 * | 3/2001 | Nagai | 123/90.34 |
| 6,247,463 B1 | 6/2001 | Fedorowicz et al. | |
| 6,279,556 B1 | 8/2001 | Busen et al. | |
| 6,290,738 B1 | 9/2001 | Holm | |
| 6,293,268 B1 | 9/2001 | Mammarella | |
| 6,354,283 B1 | 3/2002 | Hawkins et al. | |
| 6,402,798 B1 | 6/2002 | Kallsen et al. | |
| 6,418,918 B2 | 7/2002 | Mammarella | |
| 6,478,018 B2 | 11/2002 | Fedorowicz et al. | |
| 6,478,019 B2 | 11/2002 | Fedorowicz et al. | |
| 6,505,615 B2 | 1/2003 | Pietschner | |
| 6,533,712 B1 * | 3/2003 | Miller et al. | 494/60 |
| 6,568,540 B1 | 5/2003 | Holzmann et al. | |
| 6,576,045 B2 | 6/2003 | Liu et al. | |
| 6,601,385 B2 | 8/2003 | Verdegan et al. | |
| 6,626,163 B1 | 9/2003 | Busen et al. | |
| 6,684,864 B1 | 2/2004 | Busen et al. | |
| 6,797,040 B2 | 9/2004 | Lenzig | |
| 6,973,925 B2 | 12/2005 | Sauter et al. | |
| 7,080,636 B2 | 7/2006 | Knaus et al. | |
| 7,152,589 B2 | 12/2006 | Ekeroth et al. | |
| 7,156,901 B2 | 1/2007 | Hallgren et al. | |
| 7,185,643 B2 | 3/2007 | Gronberg et al. | |
| 7,238,216 B2 | 7/2007 | Malgorn et al. | |
| 7,406,960 B2 * | 8/2008 | Knauf et al. | 123/572 |
| 2005/0000572 A1 | 1/2005 | Muller | |
| 2006/0059875 A1 | 3/2006 | Malgorn et al. | |
| 2006/0062699 A1 | 3/2006 | Evenstad et al. | |
| 2006/0081229 A1 * | 4/2006 | Gronberg et al. | 123/573 |
| 2006/0124117 A1 * | 6/2006 | Knauf et al. | 123/573 |
| 2006/0249128 A1 | 11/2006 | Shieh et al. | |
| 2007/0062887 A1 | 3/2007 | Schwandt et al. | |
| 2007/0256566 A1 | 11/2007 | Faber et al. | |

FOREIGN PATENT DOCUMENTS

| | | |
|---|---|---|
| DE | 10051307 | 5/2002 |
| DE | 10320215 | 12/2004 |
| EP | 0754840 | 1/1997 |
| EP | 1068890 | 1/2001 |
| EP | 1477641 | 11/2004 |
| WO | WO-2006/119737 | 11/2006 |
| WO | WO-2007/028351 | 3/2007 |
| WO | WO-2007/137934 | 12/2007 |
| WO | WO-2007/138008 | 12/2007 |

* cited by examiner

OIL FILL CAP WITH AIR/OIL SEPARATOR

BACKGROUND AND SUMMARY

The invention relates to oil fill caps for internal combustion engines.

The invention provides an oil fill cap for an internal combustion engine, including a cap body having an air/oil separator. The cap is preferably conveniently mounted to the engine valve cover in place of a standard oil fill cap.

DETAILED DESCRIPTION

Figure 1:
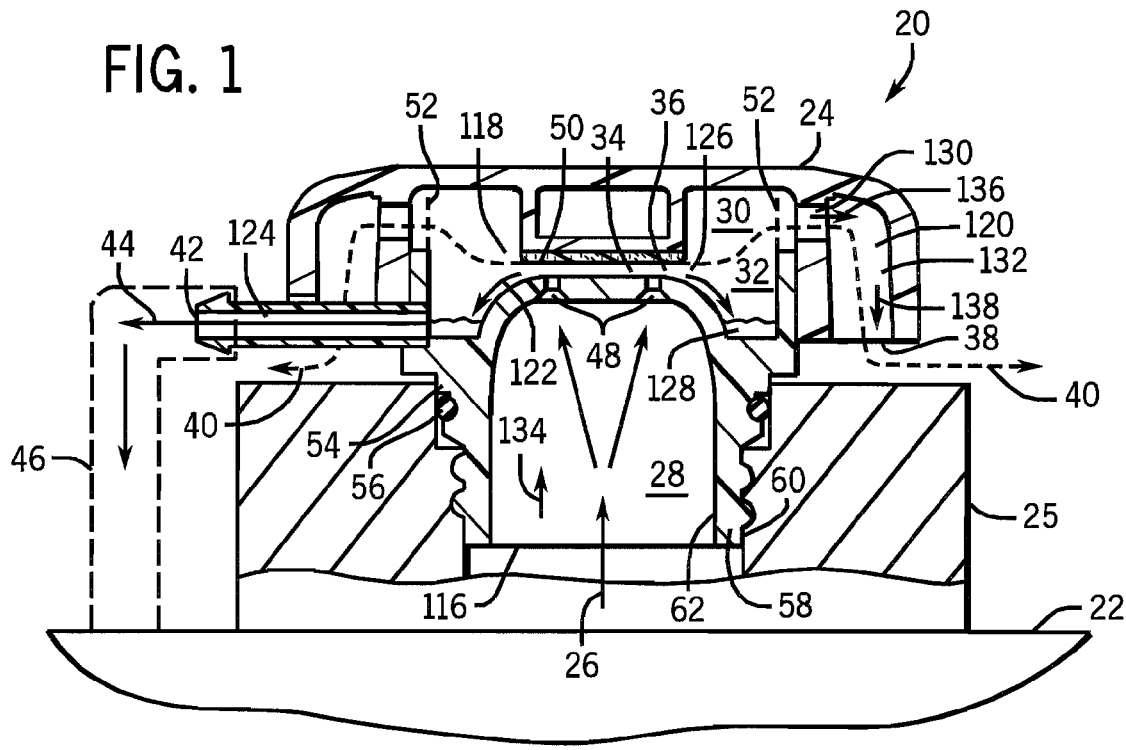
FIG. 1 is a sectional view of an oil fill cap constructed in accordance with the invention.
Figure 2:
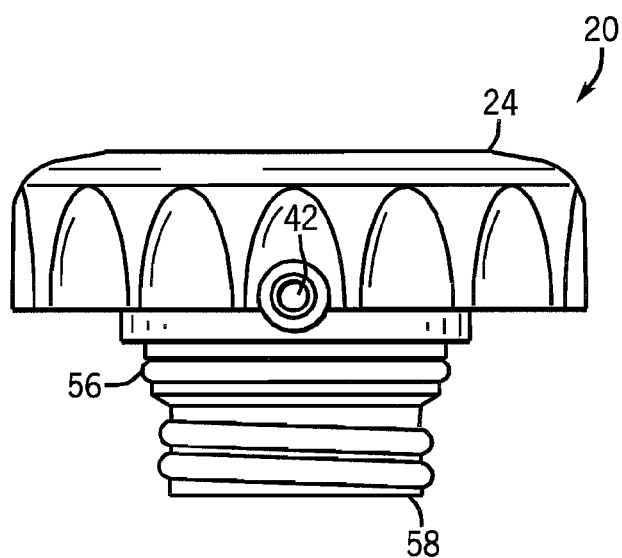
FIG. 2 is a side elevation view of the cap of FIG. 1.

FIGS. 1, 2 show an oil fill cap 20 for an internal combustion engine 22. The cap includes a cap body 24 for mounting to the engine, preferably to valve cover 25 for receiving an air/oil mixture therefrom as shown at arrow 26. The cap body has a plurality of passages therethrough, including an upstream passage 28 and first and second downstream passages 30 and 32 meeting at a separation junction 34. The cap body defines a separation zone 36 at junction 34 and receiving the air/oil mixture 26 from the engine through upstream passage 28 and sending separated air to first downstream passage 30 and sending separated oil to second downstream passage 32. First downstream passage 30 directs the separated air to a first exit port 38 from the cap body as shown at arrow 40. Second downstream passage 32 directs the separated oil to a second exit port 42 from the cap body as shown at arrow 44, which separated oil is preferably returned to the engine, as shown at dashed return tube 46. The separated air may be returned to the air intake system of the engine.

In the embodiment of FIG. 1, separation zone 36 is provided by an impaction/separation zone having one or more nozzles 48 accelerating air/oil mixture 26 against impaction media 50 to separate the air from the oil. In another embodiment, the separation zone may additionally or alternatively be provided by a coalescence/separation zone having coalescer media, for example as shown in dashed line at 52, coalescingly separating the air from the oil.

Cap body 24 is preferably mounted to valve cover 25 in threaded relation, preferably in the existing threaded oil fill hole 54 in the valve cover for receiving a standard oil fill cap. Oil fill cap 20 replaces a standard oil fill cap, and preferably includes an O-ring seal 56 sealing cap 20 in hole 54. To add oil to the engine, return tube 46 is slid off exit port 42, and cap 20 is turned counterclockwise to remove same from hole 54, whereafter oil is added through hole 54 in the valve cover, followed by replacement of cap 20 by clockwise rotation of same into threaded hole 54, followed by reconnection of tube 46 to exit port 42. Cap body 24 has a lower hollow tubular neck 58 having an outer surface 60, preferably threaded, engaging valve cover 25 at hole 54, and having an inner surface 62 defining upstream passage 28.

Figure 3:
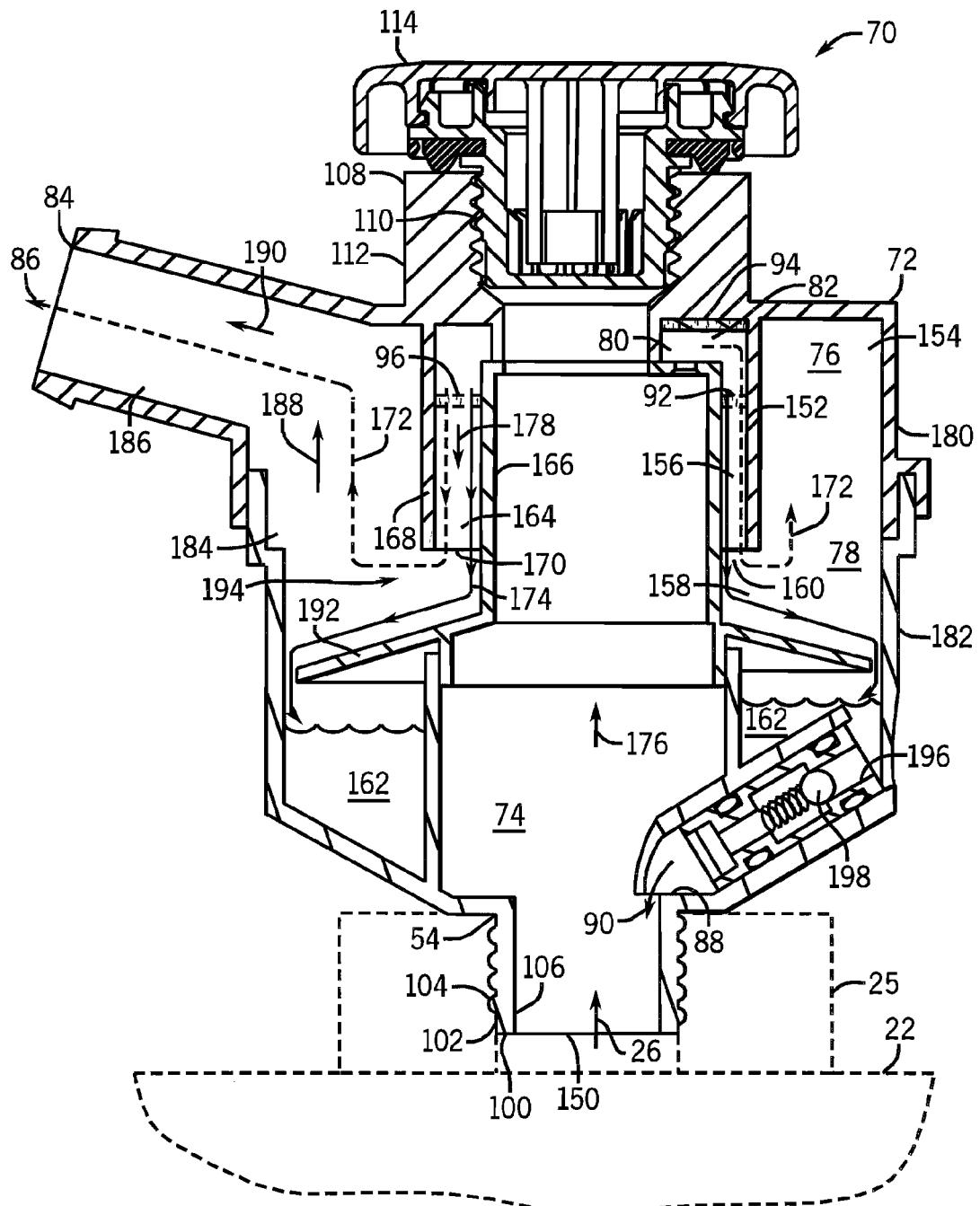
FIG. 3 is a sectional view of an alternate embodiment of an oil fill cap in accordance with the invention.

FIG. 3 shows an alternate embodiment and uses like reference numerals from above where appropriate to facilitate understanding. FIG. 3 shows an oil fill cap 70 for internal combustion engine 22. The cap has a cap body 72 for preferably mounting to the engine valve cover 25 for receiving air/oil mixture 26 therefrom. Cap body 72 defines a plurality of passages therethrough, including an upstream passage 74 and first and second downstream passages 76 and 78 meeting at a separation junction 80. The cap body defines a separation zone 82 at junction 80 and receiving air/oil mixture 26 from the engine through upstream passage 74 and sending separated air to first downstream passage 76 and sending separated oil to second downstream passage 78. First downstream passage 76 directs the separated air to a first exit port 84 from the cap body as shown at arrow 86. Second downstream passage 78 directs separated oil to a second exit port 88 from the cap body as shown at arrow 90. In the embodiment of FIG. 3, separation zone 82 is provided by an impaction/separation zone having one or more nozzles 92 accelerating air/oil mixture 26 against impaction media 94 to separate the air from the oil. In another embodiment, the separation zone is additionally or alternatively provided by a coalescence/separation zone having coalescer media such as shown in dashed line at 96 coalescingly separating air from oil. In the embodiment of FIG. 4, the separated oil is returned at exit port 88 to passage 74 of the cap body. The separated air at exit port 84 may be supplied to the air intake system of the engine.

Cap body 72, FIG. 3, is preferably mounted to valve cover 25 in threaded relation, as a replacement for a standard oil fill cap. Cap body 72 has a lower hollow tubular neck 100 having an outer surface 102, preferably threaded at 104, engaging valve cover 25 at threaded hole 54, and has an inner surface 106 defining passage 74. Cap body 72 has an upper neck 108 provided by a hollow tubular member having inner and outer surfaces 110 and 112. Inner surface 110 of upper neck 108 defines a fill passage communicating with upstream passage 74 through lower neck 100 to provide an oil fill for the engine. Upper neck 108 is closeable by a second cap 114. One of the inner and outer surfaces 106 and 102 of lower neck 100 and one of the inner and outer surfaces 110 and 112 of upper neck 108 are threaded, for thread-mounting to the engine and for thread-mounting to second cap 114, respectively. Preferably, outer surface 102 of lower neck 100 is threaded, and inner surface 110 of upper neck 108 is threaded. In FIG. 3, oil is added to the engine by threadingly removing cap 114 from cap body 72 at upper neck 108, and then pouring the oil into passage 74, while cap body 72 remains attached to engine valve cover 25 during such filling.

In FIG. 1, cap body 24 has an entrance port 116 receiving air/oil mixture 26 from the engine. Upstream passage 28 defines a rectilinear flow path from entrance port 116 to the one or more nozzles 48. Downstream passage 30 has first and second segments 118 and 120. Downstream passage 32 has first and second segments 122 and 124. First segment 118 of downstream passage 30 is common with first segment 122 of downstream passage 32. Separated air diverges from separated oil at a divergence junction 126 of the first and second segments 118 and 120 of first downstream passage 30 and first and second segments 122 and 124 of second downstream passage 32. Second segment 124 of second downstream passage 32 as it diverges from divergence junction 126 is gravitationally below second segment 118 of first downstream passage 30 as it diverges from divergence junction 126. Cap body 24 defines a collection reservoir 128 along second segment 124 of second downstream passage 32 downstream of divergence junction 126. Second exit 42 from cap body 24 is an oil drain from collection reservoir 128.

In FIG. 1, second segment 120 of first downstream passage 30 has first and second sub-portions 130 and 132 in series and passing separated air serially therethrough, namely from first segment 118 of first downstream passage 30 then through first sub-portion 130 of second segment 120 of first downstream passage 30 then through second sub-portion 132 of second segment 120 of first downstream passage 30. Air/oil mixture 26 flows along a first flow direction 134 through upstream passage 28. Separated air flows along a second flow direction 136 through first sub-portion 130 of second segment 120 of first downstream passage 30. Separated air flows along a third flow direction 138 through second sub-portion 132 of second segment 120 of first downstream passage 30. Separated air exits cap body 24 through exit port 38 along second sub-portion 132 of second segment 120 of first downstream passage 30. The noted first and third flow directions 134 and 138 enter and exit cap body 24, respectively. First and third flow directions 134 and 138 are parallel and opposite to each other. Second flow direction 136 is transverse to first and third flow directions 134 and 138.

In FIG. 3, cap body 72 has an entrance port 150 receiving air/oil mixture 26 from the engine. Upstream passage 74 defines a rectilinear flow path from entrance port 150 to the one or more nozzles 92. First downstream passage 76 has first and second segments 152 and 154. Second downstream passage 78 has first and second segments 156 and 158. First segment 152 of first downstream passage 76 is common with first segment 156 of second downstream passage 78. Separated air diverges from separated oil at a divergence junction 160 of first and second segments 152 and 154 of first downstream passage 76 and first and second segments 156 and 158 of second downstream passage 78. Second segment 158 of second downstream passage 78 as it diverges from divergence junction 160 is gravitationally below second segment 154 of first downstream passage 76 as it diverges from divergence junction 160. Cap body 72 defines a collection reservoir 162 along second segment 158 of second downstream passage 78 downstream of divergence junction 160. Second exit port 88 from cap body 72 is an oil drain from collection reservoir 162, to be further described.

In FIG. 3, common first segments 152 and 156 of first and second downstream passages 76 and 78 extend downwardly along a common flow channel 164 formed between a pair of opposing passage walls 166 and 168 in the cap body. Separated air and separated oil flow downwardly through common flow channel 164. Common flow channel 164 has a lower end 170 defining the noted divergence junction 160 and at which separated air and separated oil diverge. Separated air flows upwardly as shown at 172 along second segment 154 of first downstream passage 76. Separated oil flows downwardly as shown at 174 along second segment 158 of second downstream passage 78 to exit port 88.

In FIG. 3, air/oil mixture 26 flows upwardly along a first flow direction 176 through upstream passage 74. Separated air and separated oil flow downwardly along a second flow direction 178 through common flow channel 164. First and second flow directions 176 and 178 are opposite and parallel to each other. Cap body 72 has upper and lower sections 180 and 182. Lower section 182 has the noted wall 166 extending upwardly and defining upstream passage 74 and providing one of the noted pair of passage walls forming common flow channel 164. Upper section 180 of the cap body has the noted wall 168 extending downwardly and concentrically surrounding wall 166 and defining common flow channel 164 therebetween. Wall 168 has a lower end at 170 defining the noted divergence junction 160 of first and second segments 152 and 154 of first downstream passage 76 and first and second segments 156 and 158 of second downstream passage 78.

In FIG. 3, second segment 154 of first downstream passage 76 has first and second sub-portions 184 and 186 in series and passing separated air serially therethrough, namely from first segment 152 of first downstream passage 76 then through first sub-portion 184 of second segment 154 of first downstream passage 76 then through second sub-portion 186 of second segment 154 of first downstream passage 76. Air/oil mixture 26 flows along first flow direction 176 through upstream passage 74. Separated air then flows along a second flow direction 178 through first segment 152 of first downstream passage 76, then the separated air flows along a third flow direction 188 through first sub-portion 184 of second segment 154 of first downstream passage 76, then the separated air flows along a fourth flow direction 190 through second sub-portion 186 of second segment 154 of first downstream passage 76. The separated air exits cap body 72 through exit port 84 along second sub-portion 186 of second segment 154 of first downstream passage 76. First and third flow directions 176 and 188 are in the same direction and parallel to each other. Second flow direction 178 is opposite and parallel to flow directions 176 and 188. Flow direction 190 is transverse to flow directions 176, 178, 188.

In FIG. 3, a baffle 192 is provided in the cap body along second segment 158 of second downstream passage 78 and downstream of divergence junction 160 and upstream of collection reservoir 162 and directing separated oil to flow into collection reservoir 162. Collection reservoir 162 is gravitationally spaced below divergence junction 160 by a vertical gap 194. Baffle 192 spans laterally in gap 194 to dampen surges of oil in collection reservoir 162 towards divergence junction 160. Second segment 158 of second downstream passage 78 includes a check valve passage 196 between collection reservoir 162 and exit port 88. A one-way check valve 198 in check valve passage 196 permits oil drain flow from collection reservoir 162 to exit port 88, and blocks reverse flow from exit port 88 to collection reservoir 162. In this embodiment, oil drains from the collection reservoir back to the engine through exit drain port 88 into passage 74 when the engine is off and when there is sufficient liquid head volume in collection reservoir 162 to open check valve 198. The volume of collection reservoir 162 is selected to hold enough separated oil during running of the engine until the next shut-off, e.g. typically not more than eight hours, though the reservoir 162 can be sized according to need. In a further alternative, an oil drain tube may be provided from exit port 88 and/or reservoir 162 and extend downwardly through passage 74 into the engine valve cover if it does not interfere with components therein, such as reciprocating valve stems, rocker arms, etc.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An oil fill cap for an internal combustion engine, said cap comprising a cap body for mounting to said engine for receiving an air/oil mixture therefrom, said cap body defining a plurality of passages therethrough, including an upstream passage and first and second downstream passages meeting at a separation junction, said cap body defining a separation zone at said separation junction and receiving said air/oil mixture from said engine through said upstream passage and sending separated air to said first downstream passage and sending separated oil to said second downstream passage, said first downstream passage directing said separated air to a first exit port from said cap body, said second downstream passage directing said separated oil to a second exit port from said cap body, wherein fill oil passes into said upstream passage without passing through said separation zone, and wherein said fill oil flows into said upstream passage in the opposite direction of flow of said air/oil mixture in said upstream passage, wherein said cap body has upper and lower necks, said lower neck being a hollow tubular member having inner and outer surfaces, said inner surface defining said upstream passage, said upper neck being a hollow tubular member having inner and outer surfaces, said inner surface of said upper neck defining a fill passage communicating with said upstream passage through said lower neck to provide an oil fill for said engine, said upper neck being closeable by a second cap, said fill passage communicating with said upstream passage without passing through said separation zone, said fill passage supplying said fill oil to said upstream passage in the opposite flow direction of said air/oil mixture in said upstream passage, wherein one of said inner and outer surfaces of said lower neck and one of said inner and outer surfaces of said upper neck are threaded, said lower neck being thread-mounted to said engine, said upper neck being thread-mounted to said second cap, wherein said outer surface of said lower neck and said inner surface of said upper neck are threaded.

2. An oil fill cap for an internal combustion engine, said cap comprising a cap body for mounting to said engine for receiving an air/oil mixture therefrom, said cap body defining a plurality of passages therethrough, including an upstream passage and first and second downstream passages meeting at a separation junction, said cap body defining a separation zone at said separation junction and receiving said air/oil mixture from said engine through said upstream passage and sending separated air to said first downstream passage and sending separated oil to said second downstream passage, said first downstream passage directing said separated air to a first exit port from said cap body, said second downstream passage directing said separated oil to a second exit port from said cap body, wherein fill oil passes into said upstream passage without passing through said separation zone, and wherein said fill oil flows into said upstream passage in the opposite direction of flow of said air/oil mixture in said upstream passage, wherein said separation zone comprises an impaction/separation zone comprising one or more nozzles accelerating said air/oil mixture against impaction media to separate said air from said oil, wherein each of said first and second downstream passages has first and second segments, said first segment of said first downstream passage being common with said first segment of said second downstream passage, said separated air diverging from said separated oil at a divergence junction of said first and second segments of said first downstream passage and said first and second segments of said second downstream passage, wherein said second segment of said second downstream passage as said second segment of said second downstream passage diverges from said divergence junction is gravitationally below said second segment of said first downstream passage as said second segment of said first downstream passage diverges from said divergence junction, wherein said cap body defines a collection reservoir along said second segment of said second downstream passage downstream of said divergence junction, and wherein said second exit port from said cap body is an oil drain from said collection reservoir, and comprising a baffle in said cap body along said second segment of said second downstream passage and downstream of said divergence junction and upstream of said collection reservoir and directing said separated oil to flow into said collection reservoir.

3. The oil fill cap according to claim 2 wherein said collection reservoir is gravitationally spaced below said divergence junction by a vertical gap, and said baffle spans laterally in said gap to dampen surges of oil in said collection reservoir towards said divergence junction.

4. An oil fill cap for an internal combustion engine, said cap comprising a cap body for mounting to said engine for receiving an air/oil mixture therefrom, said cap body defining a plurality of passages therethrough, including an upstream passage and first and second downstream passages meeting at a separation junction, said cap body defining a separation zone at said separation junction and receiving said air/oil mixture from said engine through said upstream passage and sending separated air to said first downstream passage and sending separated oil to said second downstream passage, said first downstream passage directing said separated air to a first exit port from said cap body, said second downstream passage directing said separated oil to a second exit port from said cap body, wherein fill oil passes into said upstream passage without passing through said separation zone, and wherein said fill oil flows into said upstream passage in the opposite direction of flow of said air/oil mixture in said upstream passage, wherein said separation zone comprises an impaction/separation zone comprising one or more nozzles accelerating said air/oil mixture against impaction media to separate said air from said oil, wherein each of said first and second downstream passages has first and second segments, said first segment of said first downstream passage being common with said first segment of said second downstream passage, said separated air diverging from said separated oil at a divergence junction of said first and second segments of said first downstream passage and said first and second segments of said second downstream passage, wherein said second segment of said second downstream passage as said second segment of said second downstream passage diverges from said divergence junction is gravitationally below said second segment of said first downstream passage as said second segment of said first downstream passage diverges from said divergence junction, wherein said cap body defines a collection reservoir along said second segment of said second downstream passage downstream of said divergence junction, and wherein said second exit port from said cap body is an oil drain from said collection reservoir, wherein said second segment of said second downstream passage includes a drain passage between said collection reservoir and said second exit port, and comprising a one-way check valve in said drain passage permitting oil drain flow from said collection reservoir to said second exit port and blocking reverse flow from said second exit port to said collection reservoir.

5. The oil fill cap according to claim 4 wherein said second exit port drains said separated oil to said upstream passage in said cap body.

* * * * *